United States Patent
Sen et al.

(10) Patent No.: US 10,061,840 B2
(45) Date of Patent: Aug. 28, 2018

(54) METHODS AND SYSTEMS FOR PRESENTING DATA ASSOCIATED WITH A PLURALITY OF DATA SOURCES

(71) Applicant: NETAPP, INC., Sunnyvale, CA (US)

(72) Inventors: Subhabrata Sen, Bangalore (IN);
Sandeep Putrevu, Bangalore (IN);
Dhivya Mohanasundaram, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 401 days.

(21) Appl. No.: 14/861,715

(22) Filed: Sep. 22, 2015

(65) Prior Publication Data

US 2017/0083601 A1  Mar. 23, 2017

(51) Int. Cl.
*G06F 17/30* (2006.01)
*H04L 29/08* (2006.01)
*G06F 9/50* (2006.01)

(52) U.S. Cl.
CPC ......... *G06F 17/30598* (2013.01); *G06F 9/50* (2013.01); *G06F 17/30867* (2013.01); *H04L 67/1097* (2013.01)

(58) Field of Classification Search
CPC ......... G06F 17/30598; G06F 17/30867; H04L 67/1097
See application file for complete search history.

(56) References Cited

U.S. PATENT DOCUMENTS 7,698,506 B1 * 4/2010 Fair ..................... G06F 12/0868
711/113
2017/0026312 A1 * 1/2017 Hrischuk ............ H04L 67/1097

* cited by examiner

*Primary Examiner* — Cheryl Lewis
(74) *Attorney, Agent, or Firm* — Klein, O'Neill & Singh, LLP (57) ABSTRACT

Methods and systems for a networked storage environment are provided. As an example, one method includes sorting by a processor, collected data having a plurality of entries associated with a plurality of data sources in the networked storage environment based on a filter, where each data source is a resource of the networked storage environment; generating by the processor a tag for tracking a number of entries collected for each data source to present a portion of the data in response to a first request; presenting by the processor, the tag and the portion of the data in response to the first request; and using the tag by the processor for retrieving other entries for presenting another portion of the data in response to another request.

20 Claims, 5 Drawing Sheets

METHODS AND SYSTEMS FOR PRESENTING DATA ASSOCIATED WITH A PLURALITY OF DATA SOURCES

TECHNICAL FIELD

The present disclosure relates to presenting data associated with a plurality of data sources in a networked environment.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple clients with access to shared data, backing up data and others. A storage system typically includes at least one computing system executing a storage operating system for storing and retrieving data on behalf of one or more client computing systems ("clients"). The storage operating system stores and manages shared data containers in a set of mass storage devices.

Clients using network systems often request data records that are collected from multiple data sources. It is desirable to efficiently collect, sort and present data from different data sources.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one aspect, methods and systems for a networked environment are provided. As an example, one method includes sorting by a processor, collected data having a plurality of entries associated with a plurality of data sources in the networked environment based on a filter, where each data source is a resource of the networked storage environment. The method further includes generating by the processor a tag for tracking a number of entries collected for each data source to present a portion of the data in response to a first request; presenting by the processor, the tag and the portion of the data in response to the first request; and using the tag by the processor for retrieving other entries for presenting another portion of the data in response to another request.

Figure 1:
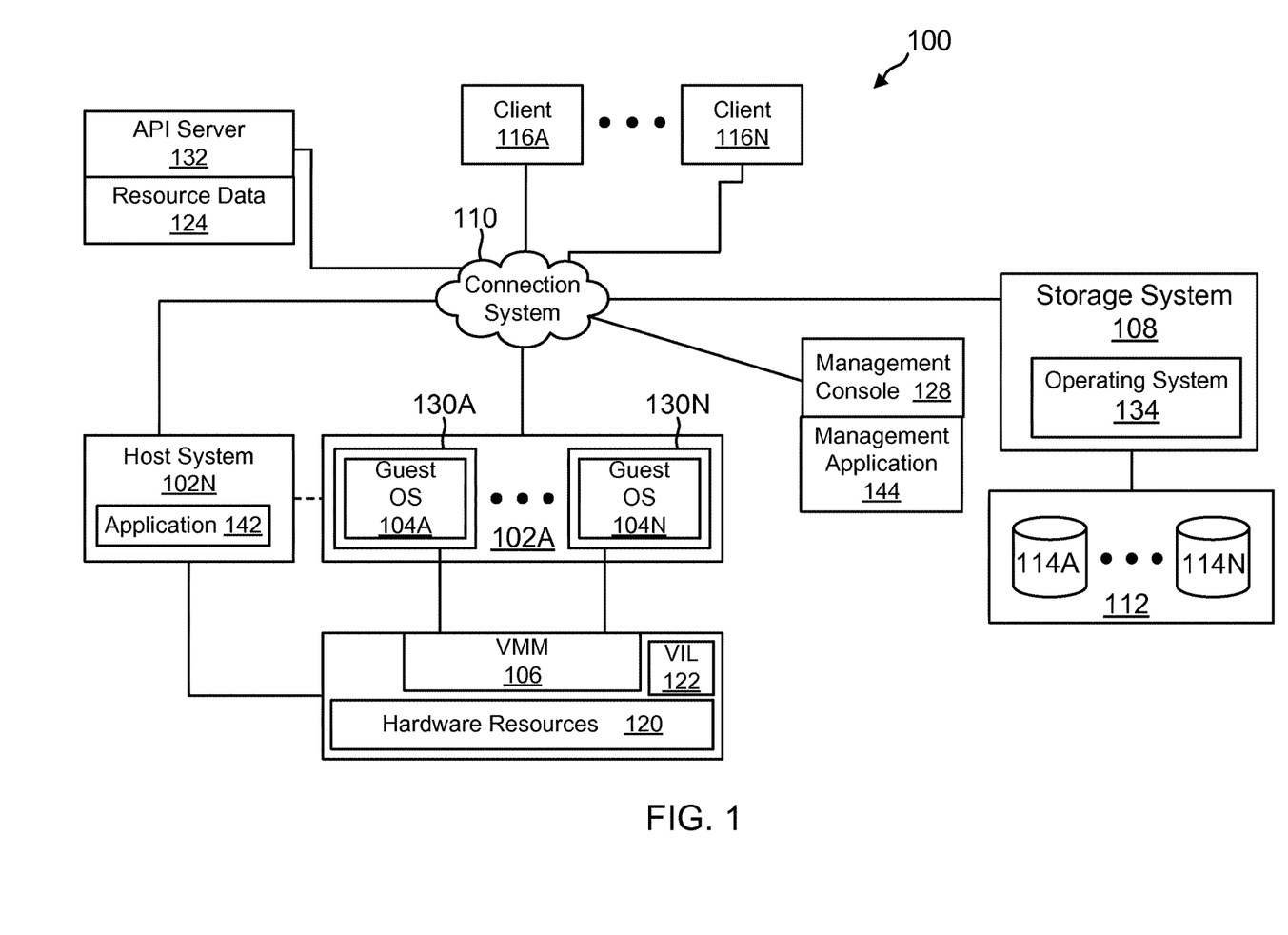
FIG. 1 shows an example of an operating environment for the various aspects of the present disclosure.

System 100:

FIG. 1 shows an example of a system 100 (or a networked storage environment 100), where the adaptive aspects disclosed herein may be implemented. In one aspect, system 100 may include a plurality of computing devices 102A-102N (may also be referred to individually as a host platform/system 102 or simply as server 102) communicably coupled to a storage system 108 executing a storage operating system 134 via a connection system 110 such as a local area network (LAN), wide area network (WAN), the Internet and others. As described herein, the term "communicably coupled" may refer to a direct connection, a network connection, or other connections to enable communication between devices.

As an example, host system 102A executes a plurality of virtual machines (VMs) in virtual environment that is described below in detail. Host 102N may execute one or more application 142, for example, a database application, an email application and other. The VMs and applications may be used to read and write data at the storage devices of the storage system 108.

Clients 116A-116N (may be referred to as client (or user) 116) are computing devices that can access storage space at the storage system 108. A client can be the entire system of a company, a department, a project unit or any other entity.

System 100 includes an application programming interface (API) server 132 that allows clients and/or storage provider to interact with storage related services and obtain information from a plurality of data sources from resource data 124, when needed. Details regarding the API server 132 are provided below.

In one aspect, storage system 108 has access to a set of mass storage devices 114A-114N (may be referred to as storage devices 114) within at least one storage subsystem 112. The mass storage devices 114 may include writable storage device media such as magnetic disks, video tape, optical, DVD, magnetic tape, non-volatile memory devices for example, solid state drives (SSDs) including self-encrypting drives, flash memory devices and any other similar media adapted to store information. The storage devices 114 may be organized as one or more groups of Redundant Array of Independent (or Inexpensive) Disks (RAID). The various aspects disclosed are not limited to any particular storage device type or storage device configuration.

In one aspect, the storage system 108 provides a set of logical storage volumes (or logical unit numbers (LUNs)) that presents storage space to clients and VMs for storing information. Each volume may be configured to store data files (or data containers or data objects), scripts, word processing documents, executable programs, and any other type of structured or unstructured data. From the perspective of one of the client systems, each volume can appear to be a single drive. However, each volume can represent storage space in at one storage device, an aggregate of some or all of the storage space in multiple storage devices, a RAID group, or any other suitable set of storage space.

The storage operating system 134 organizes storage space at storage devices 114 as one or more "aggregate", where each aggregate is identified by a unique identifier and a location. Within each aggregate, one or more storage volumes are created whose size can be varied. A qtree, sub-volume unit may also be created within the storage volumes. As a special case, a qtree may be an entire storage volume.

The storage system 108 may be used to store and manage information at storage devices 114 based on a request. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP).

Although storage system 108 is shown as a stand-alone system, i.e. a non-cluster based system, in another aspect, storage system 108 may have a distributed architecture; for example, a cluster based system. In the cluster based system, a plurality of nodes is connected by a network. The nodes include a network module for performing networking functions, a storage module for performing storage related functions and a management module for performing management functions.

System 100 includes a management console 128 that may be used to configure and manage various components of system 100. It is noteworthy that the management console 128 may include one or more computing devices executing a management application 144.

As an example, system 100 may also include a virtual machine environment where a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

Host platform 102A includes/provides a virtual machine environment executing a plurality of VMs 130A-130N that may be presented to client computing devices/systems 116A-116N. VMs 130A-130N execute a plurality of guest OS 104A-104N (may also be referred to as guest OS 104) that share hardware resources 120. Application 142 may be executed within VMs 130. As described above, hardware resources 120 may include storage, CPU, memory, I/O devices or any other hardware resource.

In one aspect, host platform 102A interfaces with a virtual machine monitor (VMM) 106, for example, a processor executed Hyper-V layer provided by Microsoft Corporation of Redmond, Wash., a hypervisor layer provided by VMWare Inc., or any other type. VMM 106 presents and manages the plurality of guest OS 104A-104N executed by the host platform 102. The VMM 106 may include or interface with a virtualization layer (VIL) 122 that provides one or more virtualized hardware resource to each OS 104A-104N.

In one aspect, VMM 106 is executed by host platform 102A with VMs 130A-130N. In another aspect, VMM 106 may be executed by an independent stand-alone computing system, referred to as a hypervisor server or VMM server and VMs 130A-130N are presented at one or more computing systems.

It is noteworthy that different vendors provide different virtualization environments, for example, VMware Corporation, Microsoft Corporation and others. Data centers may have hybrid virtualization environments/technologies, for example, Hyper-V and hypervisor based virtual environment. The generic virtualization environment described above with respect to FIG. 1 may be customized depending on the virtual environment to implement the aspects of the present disclosure. Furthermore, VMM 106 (or VIL 122) may execute other modules, for example, a storage driver, network interface and others, the details of which are not germane to the aspects described herein and hence have not been described in detail.

In conventional systems, when a client wants to obtain information regarding different resources (or data sources) of system 100, a management application typically collects data from different data sources. The data is typically pre-fetched and stored at a centralized cache. The system may have stale data that may not be very useful to the client. The centralized cache may not be scalable when dealing with multiple data sources. The technology and solutions presented herein overcome these short comings by providing a stateless system for collecting, managing and then sorting the data.

In one aspect, methods and systems are provided for collecting records (samples or entries, used interchangeably throughout this specification) from a plurality of data sources "on the fly" that is when the data is requested by a user. If the total number of collected records from all the data sources is less than or equal to the requested number of records, the records are provided to the user, without any iteration or pagination. If the number of collected records exceed the requested number, then a portion of the records are selected, where the number of entries in the portion is equal to the number of records requested by the user. The number of records from each data source are identified as an "offset" value and inserted in a "nextTag" for subsequent iterations. During each subsequent iteration, the nexTag is parsed and the offset value is used for pagination. Details regarding this process is provided below with respect to FIG. 3.

Conventional systems today also fail to provide a solution for collecting data entries from different data sources, aggregate the data based on a desired time interval between the samples (i.e. when data was collected) and then presenting the samples in different pages, where the page size is defined by the number of records as well as a timestamp range.

The various adaptive aspects of the present disclosure collect data entries from a plurality of data sources, when the data is requested. When the number of collected samples exceed the number of requested records, then a portion of the collected entries are provided, where the number of samples in the portion is equal to the number of requested records. To return the portion of collected entries, the timestamp of the oldest entry from each data source is used as an offset value for the nextTag, for subsequent iterations. In one aspect, as described below in detail with respect to FIG. 4, the timestamp is used for pagination of the data source entries.

Figure 2:
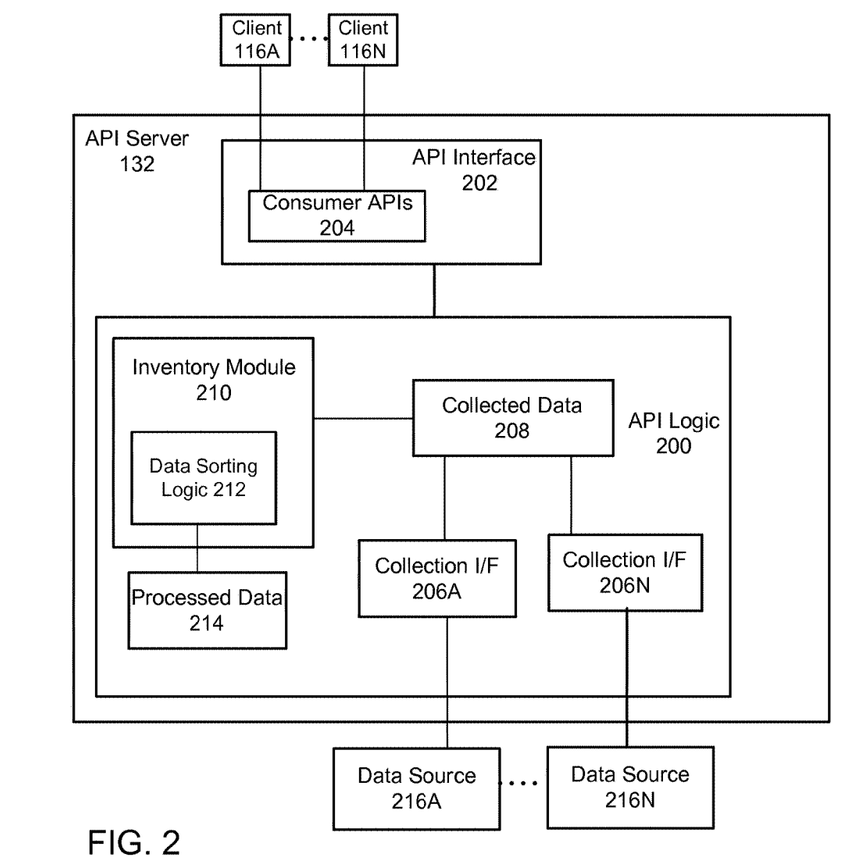
FIG. 2 shows an example of an application programming interface (API) server, according to one aspect of the present disclosure.

API Server 132:

FIG. 2 shows an example of the API server architecture, according to one aspect of the present disclosure. The API server 132 includes an interface 202 that provides APIs 204 to clients 116. APIs 204 may be implemented as a REST API, where REST means "Representational State Transfer". REST is a scalable system used for building web services. REST systems/interface may use HTTP (hyper-text transfer protocol) or other protocols for communicating. When implemented as a REST API, the API module interface 202 receives a request and provides a response to the request. In one aspect, the request may be for records regarding one or more data sources 216A-216N, described below. The response may be based on a task that is completed by API logic 200, also described below in detail. The adaptive aspects described herein are not limited to REST based APIs or any specific protocol.

In one aspect, the API server 132 may implement API logic 200 using hardware based processing logic, computer instructions and a combination thereof. API logic 200 interfaces with the plurality of data sources 216A-216N (may be referred to as data source 216 or data sources 216) using collection interface 206A-206N (may be referred to a collection interface 206). The data sources 216 are resources used in system 100 described above. The resources may be computing resources (for example, hardware processors, processing logic, memory, and others) used by the host systems 102 and storage system 108 for processing read and write requests, network resources (for example, switches, network interface cards and others), storage devices 112 used for storing data for clients 116; software applications 142 and VMs, hardware resources 120 used in the virtual machine environment and others. Each data source is identified, for example, as ds_1, ds_2 and so forth.

Data entries (or records) from each data source is collected by the collection interface 206 and may be temporarily stored as collected data 208. The collection interface 206 includes logic and circuitry for interfacing with the data sources for collecting data source related information. The collected data 208 is provided to or accessed by an inventory module 210 that includes data sort logic 212. It is noteworthy that data may be collected on demand or at a scheduled interval. The data sort logic 212 processes the collected data 208 and generates processed data 214 (or 124) that is described below in detail. The processed data 214 may be presented to client 116 via APIs 204 using the processes described below with respect to FIGS. 3 and 4.

Figure 3:
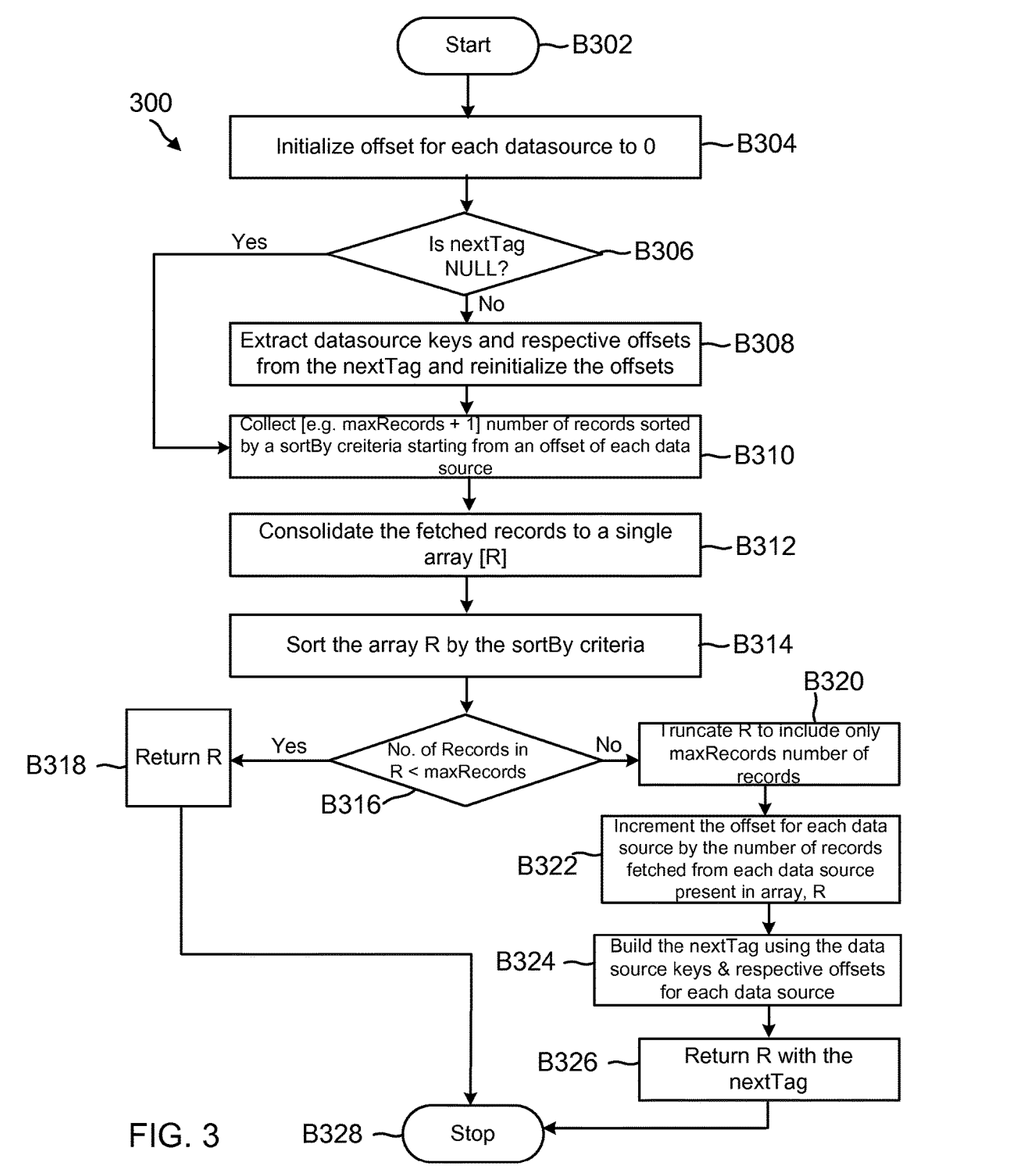
FIG. 3 shows a process flow for presenting data using an offset value, according to one aspect of the present disclosure.

Process Flows:

FIG. 3 shows a process 300 for generating a tag to track data sources for data entries collected from the data sources, according to one aspect of the present disclosure. The process begins in block B302, when data entries (or samples, used interchangeably throughout the specification) have been collected regarding different resources of system 100. The data may be collected on-demand or based on a specified schedule. The type of data that is collected depends on the operating environment and user preferences. Data may be collected regarding utilization of different storage devices, the amount of data that is transferred for different devices, latency i.e. delay in processing I/O requests for different storage volumes or any other data type. A user may request to see a certain number of records that may have to be paginated in more than one iteration.

In one aspect, assume that there are N number of data sources. The data sort logic 210 defines an input array, D, that is defined by a plurality of fields, for example, [Data Source ID, nextTag; maxRecords, sortBy]. The Data Source ID identifies each data source 216 for example, by a using a unique key, "ds_key", such that ds_key=1, 2, . . . , N.

The nextTag is a [String] of tag values that are used for paginated iteration of records requested by a user. The nextTag may be of the form: ds_key1:offset1; ds_key2:offset2; . . . ; ds_keyM:offsetM [where M<=N]. The offset in nextTag indicates a total number of records already fetched from a particular data source that has been presented to the user.

maxRecords is an [Integer] value that provides a number of records that need to be fetched or retrieved for each paginated iteration.

sortBy may be a [String] that defines the field or criteria to sort the collected records associated with different data sources.

In one aspect, the data sort logic 212 generates an Output Array R that includes a maximum number of records (maxRecords numbers or less) collected from the data sources in the input array D after applying the sortBy criteria and the nextTag values, as described below in detail.

In block B304, the offset value for each data source is set to 0 (or Null), for example, ds_offset[i] is set to zero. The ds_paginated_records[i] is also set to zero. The ds_paginated_records[i] defines the number of records in output array R, collected from data source with ds_key=i.

In block B306, the process determines if the nextTag value is null. If not, then in block B308, the data source keys and the respective offsets from the nextTag are extracted and re-initialized to values of offset obtained from the nextTag. If yes, then the process moves to block B310. The data sort logic 212 retrieves a number of records from the data sources, such that the number of records is one record greater than the maximum value i.e. the maxRecords+1 value described above.

In block B312, the collected records are consolidated in a single array R, described above. The records are then sorted by the sortBy criteria, in block B314. This criteria may be defined by a user.

In block B316, the process determines if the number of records is less than the maxRecords defined above. If yes, then the records are provided to the user in block B318 and the process ends in block B328.

If the number of records is greater than the maxRecords value defined above, then in block B230, the array is truncated so that the number of entries in the truncated array R includes only the maximum number of requested records.

In block B322, the offset value for each data source is then increased by the number of records that are retrieved for each data source and will be presented to the user. In block B324, the nextTag is built with the data source identifier and the updated offset values. The records and the nextTag are then provided to the user in block B326 and the process then ends.

The following provides an example for generating computer instructions for executing the process blocks of FIG. 3 for generating the output R using the input array, D, as defined above.

```
1.  if nextTag ≠ Null
        // Used for subsequent iterations
        tokens ←split (nextTag, tag_delimiter)
        // split( ) splits the nextTag
        // tag_delimiter (e.g., semi-colon ';')
2.  for i ←1 to size(tokens)
        // size( ) returns the number of elements in the input array
3.      parts ←split (tokens[i], token_delimiter)
        // splits the token into parts by token_delimiter (say, colon
        ':') Each token can be of the form: ds_key:offset
4.      ds_key ←parts[1]
5.      offset ←parts[2]
6.      ds_offset[ds_key] ←offset
7.  for i ←1 to maxRecords + 1
        // Prepare the result array
8.      R[i]←Null
9.  for i ←1 to N
        // Instead of processing each data source one by one
        (iteratively), it can be done concurrently or using divide-and-
        conquer
10.     if ds_offset[i] >= 0
        // Collect records from a data source, when offset is valid
11.         records ←collect (D[i], ds_offset[i], maxRecords + 1, sortBy)
        // collect( ) method returns the specified number of records
        sorted by the sortBy criteria from the given offset of the data
        source
12.         ds_collected_records[i] = size(records)
13.         R = sort(R, records, sortBy)
        // sort( ) method sorts input arrays by the specified sortBy
        criteria and returns the array
14.         if size(R) < maxRecords
15.             return R
        // If the total records collected is less than the specified
        maxRecords, no need to generate nextTag as no more records are left
        [Block B316, Fig 3]
16.  for i ←1 to maxRecords
17.      ds_key ← get_ds_key(R[i])
            // identify the data source key from which the record was
            fetched [Block B322]
18.      ds_offset[ds_key] ←ds_offset[ds_key] + 1
19.      ds_paginated_records[ds_key] =
             ds_paginated_records[ds_key] + 1
20.      nextTag ← ""
         // Initialize nextTag to empty string
21.  for ds_key ←1 to N
         if ds_paginated_records [ds_key] =
         ds_collected_records[ds_key]
         Set ds_offset[ds_key] = −1
         nextTag ←nextTag + ds_key + token_delimiter +
         ds_offset[ds_key] + tag_delimiter
             // Here, token_delimiter can be colon ':' and
             tag_delimiter can be semi-colon (';')
22.      R[maxRecords + 1] ←NULL
             // Set the extra element to NuLL as only maxRecords;
             maxRecords number of records are returned
23.      Return R
```

Figure 4:
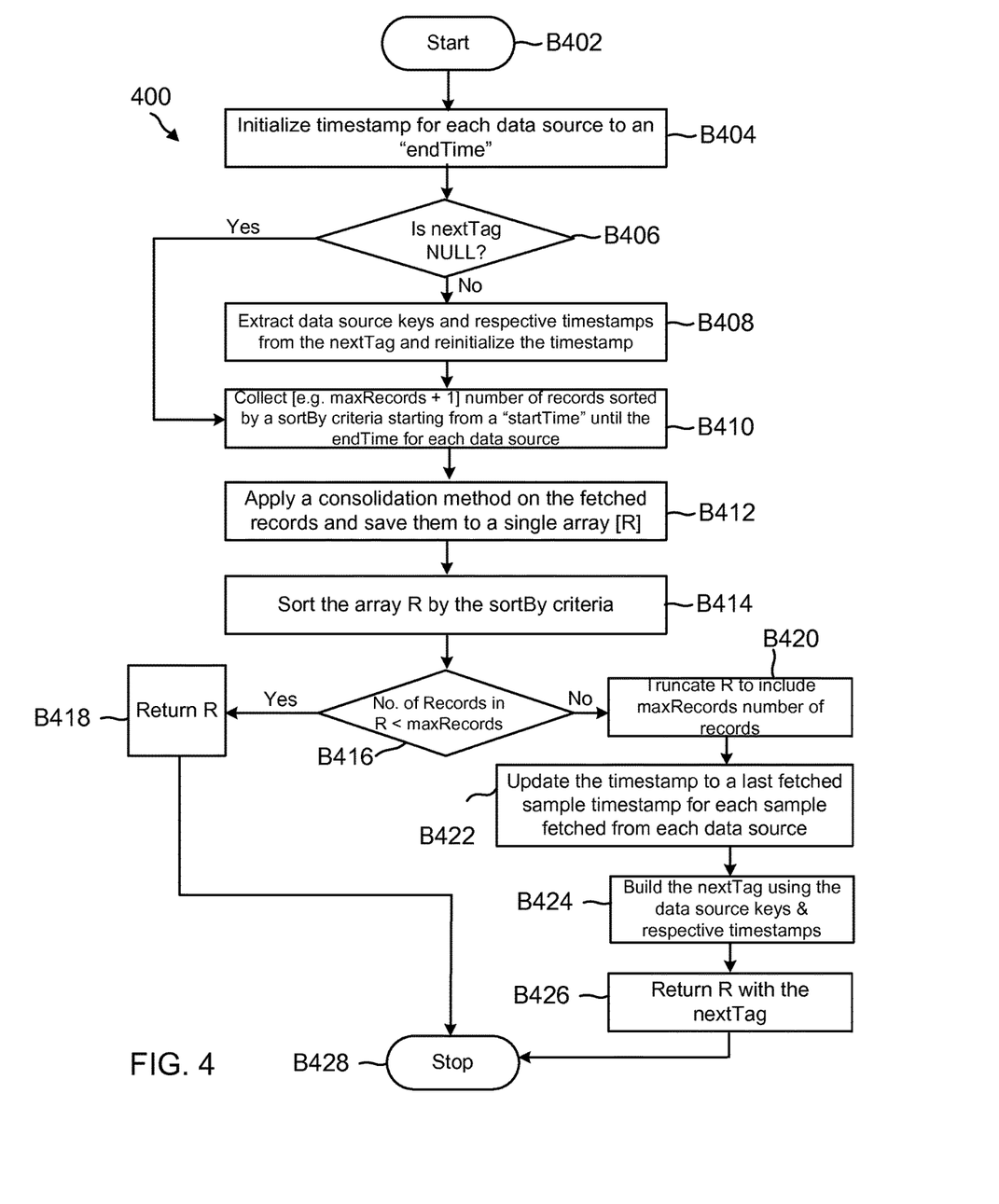
FIG. 4 shows a process flow for presenting data using a timestamp value, according to one aspect of the present disclosure.

FIG. 4 shows a process 400 where instead of using an offset value in the nextTag, a timestamp value is used for filtering and managing data records associated with a plurality of data sources, according to one aspect of the present disclosure. For process 400, the input array used by data sort logic 212 is defined by [Data Source ID, nextTag, "max-Samples", "sortBy", "sampleInterval", "consolidation-Method", "startTime", "endTime"]. As described above, the Data Source ID identifies the various data sources by a key, for example, ds_key, and for simplicity, assume ds_key=1, 2, . . . , N.

The nextTag for paginated iteration maybe in the following format:
ds_key1:timestamp1;ds_key2:timestamp2; . . . ;ds_keyM: timestampM [M<=N].

The "maxSamples" field, for example, an [Integer] provides a number of samples (or records) for each paginated iteration. The sortBy field provides the sorting criteria for sorting collected records.

The startTime marks the start time for the requested records. If not specified, then the records starting from the oldest collected timestamp (assuming the ordering is from latest to oldest timestamp) to an end time are used. The endTime is a timestamp value that provides the end time for the records that are provided to a user. If not specified, then the records from the start time to the latest collected record (assuming the ordering is from latest to oldest timestamp) are used.

The sampleInterval field may be an [Integer] that specifies a desired interval between collected records from various data sources.

The "consolidationMethod" may be a [String] value. If a specified sample interval is greater than a default interval for collecting records, then a consolidation method is used for an aggregation function, for example, [MIN, MAX, AVG, LAST] value of the records is used to consolidate the records.

Based on the input array defined above, the process 400 returns an output array, R that includes samples collected from the data sources after applying the sortBy criteria and the nextTag value.

The process begins in block B402, when the API server 132 is operational and records from the plurality of data sources has been collected.

In block B404, the timestamp for each data source is initialized to an end time value. The timestamp for the paginated samples for each data source is set to 0.

In block B406, the process determines if the nextTag value is null. If not, then in block B408, the data source keys (ds_key) is extracted with the respective timestamp values and the timestamps are re-initialized. If the nextTag is null, then in block B410, records are collected or retrieved for each data source from a specified start time to an end time. The number of records may exceed the maximum number of requested records.

In block B412, a consolidation method is applied on the retrieved records. The consolidation method groups the collected records into a plurality of sets based on a sample time interval and then a specific consolidation technique is applied to the data. If the consolidation method is "LAST", then the latest record from each set is used. If the consolidation method is MIN or MAX, then each set is sorted and the minimum or maximum record value is used. When the consolidation method is AVG (i.e. average), then the average of all the records is determined and the timestamp is set as the latest timestamp, then the entries are ordered from the latest to the oldest timestamp. The consolidated data is then saved and in block B414, the records are sorted by the sortBy criteria.

In block B416, the process determines if the number of available records is less than the maximum number of requested records. If yes, then the records are provided to the user in block B418 and the process ends in block B428 process ends.

If the number of records exceeds the maximum number of requested entries, then in block B420, the array R is truncated to include only the maximum i.e. requested number of records. In block B422, the timestamp value for each data source record is updated to the last fetched record's timestamp value from the data source. The nextTag is then built in block B424 with the data source identifier and the respective timestamps. The records and the nextTag are then returned in block 426. Thereafter the process ends in block B428.

The following provides an example for generating computer instructions for executing the process blocks of FIG. 4 for generating the output R using the input array and creating the nextTag using the timestamp values, as defined above.

SORTED_PAGINATION: Input Array D: (Data Source Id, nextTag, maxSamples, sortBy, sampleInterval, consolidationMethod, startTime, endTime)

1. for i ←1 to N
    // N is the number of data sources
2.     ds_timestamp[i] ←endTime
    // Initialize timestamps for the data sources with the provided endTime
3.     ds_paginated_samples[i] ← 0
    // Initialize the paginated timestamps to 0
4. if nextTag ≠ NULL
    // Used for subsequent iterations
5.     tokens ←split (nextTag, tag_delimiter)
    // split( ) splits the nextTag into tokens by using tag_delimiter (say, semi-colon ';')
6.     for i ←1 to size(tokens)
    // size( ) returns the number of elements in the input array
7.         parts ←split (tokens[i], token_delimiter)
    // splits the token into parts by token_delimiter (say, colon ':').
    // Each token maybe of the form: ds_key:timestamp
8.         ds_key ←parts[1]
9.         timestamp ←parts[2]
10.        ds_timestamp[ds_key] ← timestamp
11.    for i ←1 to maxSamples + 1
    // Prepare the result array R
12.        R[i]←NULL
13.    for i ←1 to N
    // Instead of processing each data source one by one (iteratively), it may be executed concurrently or using divide-and-conquer
14.        if ds_timestamp[i] >= 0
    // Collect records from a data source when the timestamp is valid
15.            samples ←collect (D[i], ds_timestamp[i], maxSamples + 1, sortBy, startTime)
    //collect( ) method returns the specified records/entries sorted by the sortBy criteria from the given timestamp of the data source
16.            consolidated_samples ← consolidate_samples (samples, sampleInterval, consolidationMethod)
17.            ds_collected_samples[i] = size(consolidated_samples)
18.            R = sort(R, consolidated_samples, sortBy)
    // sort( ) method sorts input arrays by the specified sortBy criteria/returns the sorted array
19.    if size(R)< maxSamples
20.        return R
    // If the number collected records is less than the specified maxSamples, nextTag is not generated
21.    for i ←1 to maxSamples
22.        ds_key ← get_ds_key(R[i])
    // Identify the data source key from which the record was fetched
23.        if R[i]->timestamp > ds_timestamp[ds_key]
24.            ds_timestamp [ds_key] = R[i]->timestamp SORTED_PAGINATION: Input Array D: (Data Source Id, nextTag, maxSamples, sortBy, sampleInterval, consolidationMethod, startTime, endTime)

Figure 5:
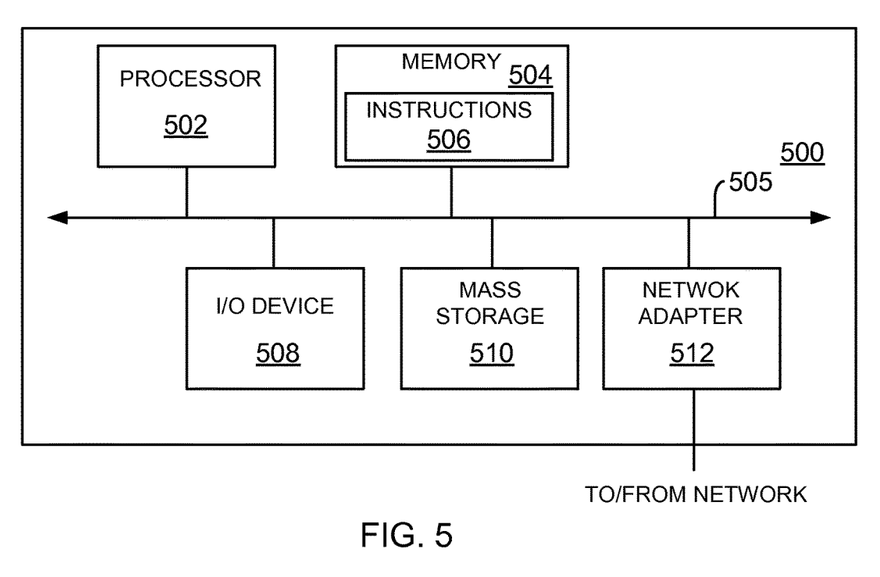
FIG. 5 shows an example of a processing system, used according to one aspect of the present disclosure.

// This will be the last fetched timestamp from a particular data source
25.        ds_paginated_samples[ds_key] = ds_paginated_samples[ds_key] + 1
26.    nextTag ← ""
    // Initialize nextTag to empty string
27.    for ds_key ←1 to N
    if ds_paginated_samples [ds_key] = ds_collected_samples[ds_key]
28.        ds_timestamp[ds_key] = -1
29.        nextTag ←nextTag + ds_key + token_delimiter + ds_timestamp[ds_key] + tag_delimiter
    // Here, token_delimiter can be colon ':' and tag_delimiter can be semi-colon (';')
30.    R[maxSamples + 1] ←NULL
    // Set the extra element to NULL as only maxSamples number of samples should be returned
31.    return output R Processing System:

FIG. 5 is a high-level block diagram showing an example of the architecture of a processing system 500 that may be used according to one aspect. The processing system 500 can represent host system 102, API server 132, monitoring console 128, and clients 116. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement the process steps of FIGS. 3 and 4 described above may reside in and execute (by processors 502) from memory 504. Instructions 506 may also be used to implement data sort logic 212. In another aspect, the data sort logic 212 may be implemented by customized hardware based, processing logic, for example, a processor, state machine, ASIC and others.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks. The network adapter 512 provides the processing system 500 with the ability to communicate with remote devices (e.g., storage servers, clients and others) over a network and may be, for example, an Ethernet adapter, a Fibre Channel adapter, or the like.

The processing system 500 also includes one or more input/output (I/O) devices 508 coupled to the bus system 505. The I/O devices 508 may include, for example, a display device, a keyboard, a mouse, etc.

Cloud Computing:

The system and techniques described above are applicable and especially useful in the cloud computing environment where storage is presented and shared across different platforms. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to a network, for example, the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The storage systems described above can be a part of the server layer for providing storage services. Details regarding these layers are not germane to the inventive aspects.

Thus, a method and apparatus for managing data from a plurality of data sources have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
    initializing by a processor, an offset value for a tag in an input data structure for a plurality of data sources configured as resources of a networked storage system, each tag tracking a portion of data provided for an associated data source to an application;
    in response to a request for data for a data source:
        extracting by the processor, from the input data structure, an offset value of a tag associated with the data source;
        retrieving by the processor, a data portion of the data using the extracted offset value:
        generating by the processor, an output data structure for the retrieved data portion;
        truncating by the processor, the retrieved data portion when the retrieved data portion exceeds a maximum data size;
    providing by the processor, the tag and the truncated portion of the retrieved data portion from the output data structure; and
    updating the tag at the input data structure by the processor, for retrieving another portion of the data in response to another request that includes the provided tag.

2. The method of claim 1, wherein the request for the data is received by an application programming interface (API).

3. The method of claim 1, wherein the tag includes an identifier for each data source and the offset value for each tag indicates a number of entries provided in response to a request for a data source.

4. The method of claim 1, wherein the tag includes an identifier for each data source and a timestamp value indicating a time interval when entries for each data source were collected.

5. The method of claim 4, wherein for presenting the truncated portion of the data, a plurality of entries are consolidated based on a time interval and an aggregation function.

6. The method of claim 5, wherein the aggregation function selects one of a minimum value, a maximum value, an average value and a last value for the plurality of entries.

7. The method of claim 1, wherein the truncated portion of the data is based on a number of requested records in the request.

8. A non-transitory, machine readable medium having stored thereon instructions comprising machine executable code which when executed by a machine, causes the machine to:
    initialize an offset value for a tag in an input data structure for a plurality of data sources configured as resources of a networked storage system, each tag tracking a portion of data provided for an associated data source to an application;
    in response to a request for data for a data source:
        extracting from the input data structure, an offset value of a tag associated with the data source;
        retrieve a data portion of the data using the extracted offset value;
        generate an output data structure for the retrieved data portion;
        truncate the retrieved data portion when the retrieved data portion exceeds a maximum data size;
    provide the tag and the truncated portion of the retrieved data portion from the output data structure; and
    update the tag at the input data structure for retrieving another portion of the data in response to another request that includes the provided tag.

9. The storage medium of claim 8, wherein the request for the data is received by an application programming interface (API).

10. The storage medium of claim 8, wherein the tag includes an identifier for each data source and the offset value for each tag indicates a number of entries provided in response to a request for a data source.

11. The storage medium of claim 8, wherein the tag includes an identifier for each data source and a timestamp value indicating a time interval when entries for each data source were collected.

12. The storage medium of claim 11, wherein for presenting the truncated portion of the data, a plurality of entries are consolidated based on a time interval and an aggregation function.

13. The storage medium of claim 12, wherein the aggregation function selects one of a minimum value, a maximum value, an average value and a last value for the plurality of entries.

14. The storage medium of claim 8, wherein the truncated portion of the data is based on a number of requested records in the request.

15. A system, comprising:
a memory containing machine readable medium comprising machine executable code having stored thereon instructions; and a processor module coupled to the memory, the processor module configured to execute the machine executable code to:
initialize an offset value for a tag in an input data structure for a plurality of data sources configured as resources of a networked storage system, each tag tracking a portion of data provided for an associated data source to an application;
in response to a request for data for a data source:
extracting from the input data structure, an offset value of a tag associated with the data source;
retrieve a data portion of the data using the extracted offset value;
generate an output data structure for the retrieved data portion;
truncate the retrieved data portion when the retrieved data portion exceeds a maximum data size;
provide the tag and the truncated portion of the retrieved data portion from the output data structure; and
update the tag at the input data structure for retrieving another portion of the data in response to another request that includes the provided tag.

16. The system of claim 15, wherein the request for the data is received by an application programming interface (API).

17. The system of claim 15, wherein the tag includes an identifier for each data source and the offset value for each tag indicates a number of entries provided in response to a request for a data source.

18. The system of claim 15, wherein the tag includes an identifier for each data source and a timestamp value indicating a time interval when entries for each data source were collected.

19. The system of claim 18, wherein for presenting the truncated portion of the data, a plurality of entries are consolidated based on a time interval and an aggregation function.

20. The system of claim 19, wherein the aggregation function selects one of a minimum value, a maximum value, an average value and a last value for the plurality of entries.

* * * * *